United States Patent [19]
Welker

[11] 4,387,592
[45] Jun. 14, 1983

[54] PROBE INSERTION APPARATUS
[75] Inventor: Robert H. Welker, Sugar Land, Tex.
[73] Assignee: Welker Engineering Company, Sugar Land, Tex.
[21] Appl. No.: 279,429
[22] Filed: Jul. 1, 1981
[51] Int. Cl.³ .............................................. G01F 15/18
[52] U.S. Cl. ...................................... 73/198; 73/432 R
[58] Field of Search ........................ 73/86, 198, 432 B; 137/317

[56] References Cited
U.S. PATENT DOCUMENTS

| | | | |
|---|---|---|---|
| 2,870,629 | 1/1959 | Willis | 73/86 |
| 3,007,340 | 11/1961 | Kraftson | 73/432 |
| 4,152,936 | 5/1979 | Boykin et al. | 73/198 |
| 4,177,676 | 12/1979 | Welker | 73/432 |

Primary Examiner—Herbert Goldstein
Attorney, Agent, or Firm—Gunn, Lee & Jackson

[57] ABSTRACT

For use with a turbine meter or other gauging device to be inserted into a pipeline, the preferred and illustrated embodiment of the present invention discloses a probe insertion apparatus adapted to selectively insert and selectively remove such a probe. This apparatus is adapted to be attached to the end of a tee, mounted on a flange plate, at right angles to a pipeline, and supports a probe of specified dimensions to insert the probe to the center of the pipeline. The apparatus includes a lower flange of specified dimensions connecting to a set of tie bolts extending to a header plate. The header plate is the lower head of a power cylinder. The power cylinder encloses a piston and protruding piston rod which rod in turn connects with elongate tubular housing affixed to the test instrument.

9 Claims, 4 Drawing Figures

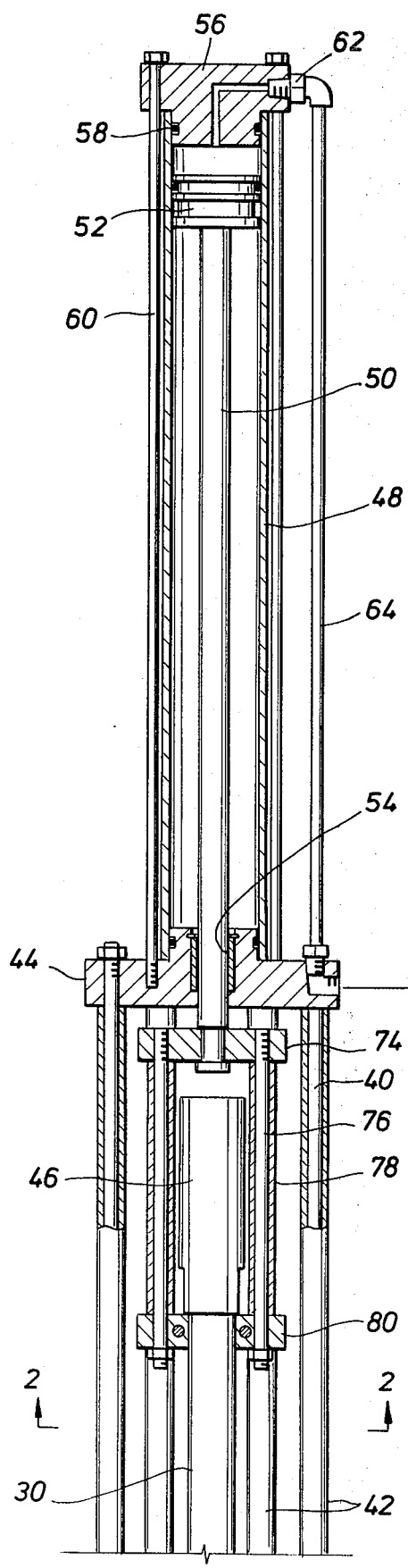
FIG. 1A
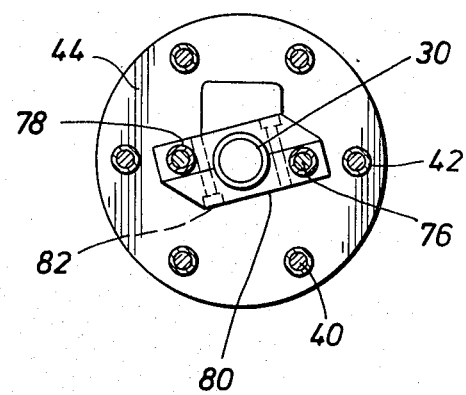
FIG. 2
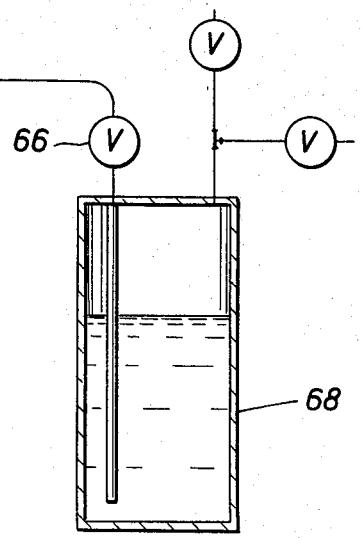

4,387,592

PROBE INSERTION APPARATUS

BACKGROUND OF THE DISCLOSURE

As set forth in prior U.S. Pat. No. 4,177,676 of this inventor, an injection apparatus for positioning a transducer head in a pipeline is disclosed. That device is met with significant success in the market place. Another reference of interest is U.S. Pat. No. 4,152,936. This disclosure is directed to an apparatus which enables the insertion of a specially shaped probe into a pipeline. For instance, the probe may mount a fluid rotated volumetric transducer to be placed in the pipeline. Such a device typically includes a small propeller or turbine which is affixed at the end. This device forms electronic signals. The electronic signals must be shaped, amplified and otherwise processed. This disclosure is directed to equipment which mounts the electronic apparatus in the form of an elongate tubular member attached to the probe. In other words, an elongate tubular member terminating in a head is inserted into the pipeline. Typically, the head is aligned with the centerline axis of the pipeline and the probe has a mounting body or wand used in positioning the head. This device is particularly adapted to incorporate the electronic equipment, including signal shaping circuitry, various conductors and other paraphernalia in an elongate hollow cylindrical housing which connects at its bottom to the transducer head and which connects at the top of a laterally extending signal cable for transferring power and signals to remote equipment.

This device is therefore cooperative with a probe which is comprised of several components including a lower head, an elongate hollow tubular body, and an electrical fitting at the other end of the tubular body. The present apparatus thus positions a transducer of the described construction as support equipment. The nature of the transducer itself is not critical; it can be a flowmeter as an example. It can also be a probe mounted thermometer. Other transducers can be suggested.

This apparatus enables the insertion of the head of the probe to a specified depth. It is adapted to be used with pipelines of different diameters. As the diameter varies, the stroke typically is varied. Seeking ideal circumstances, the head of the probe should be located at the centerline axis. To the end, this disclosure is directed to an apparatus whereby the probe and support structure are handled in this fashion.

The disclosed apparatus thus incorporates an upstanding open framework which is formed on a bottom adapter flange. The flange supports a set of seals which surround the probe body. The probe body is an elongate tubular body. The probe body is able to be inserted through a seal mechanism at the adapter flange. The probe body slides downwardly through the seal. The probe body extends upwardly through several tie bolts and tubing, sliding axially below header plate. This defines an open framework permitting access to the probe body. The header plate in turn supports a cylinder which cooperates with heads at both ends to provide power for a piston connected to a piston rod. The piston rod is in turn connected by a yoke to the probe body. This drives the probe head to the center of the pipeline.

With the foregoing structure in mind, this apparatus is illustrated through the drawings described below whereupon the preferred embodiment of the present disclosure will be set forth.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

FIGS. 1a and 1b are a sectional view through the probe insertion apparatus of this disclosure connected to a pipeline for inserting a probe head there into;

FIG. 2 is a sectional view taken along the line 2—2 of FIG. 1 showing details of construction of a yoke joining the power driving mechanism to the probe body.

DETAILED DESCRIPTION OF THE PREFERRED EMBODIMENT

Figure 1B:
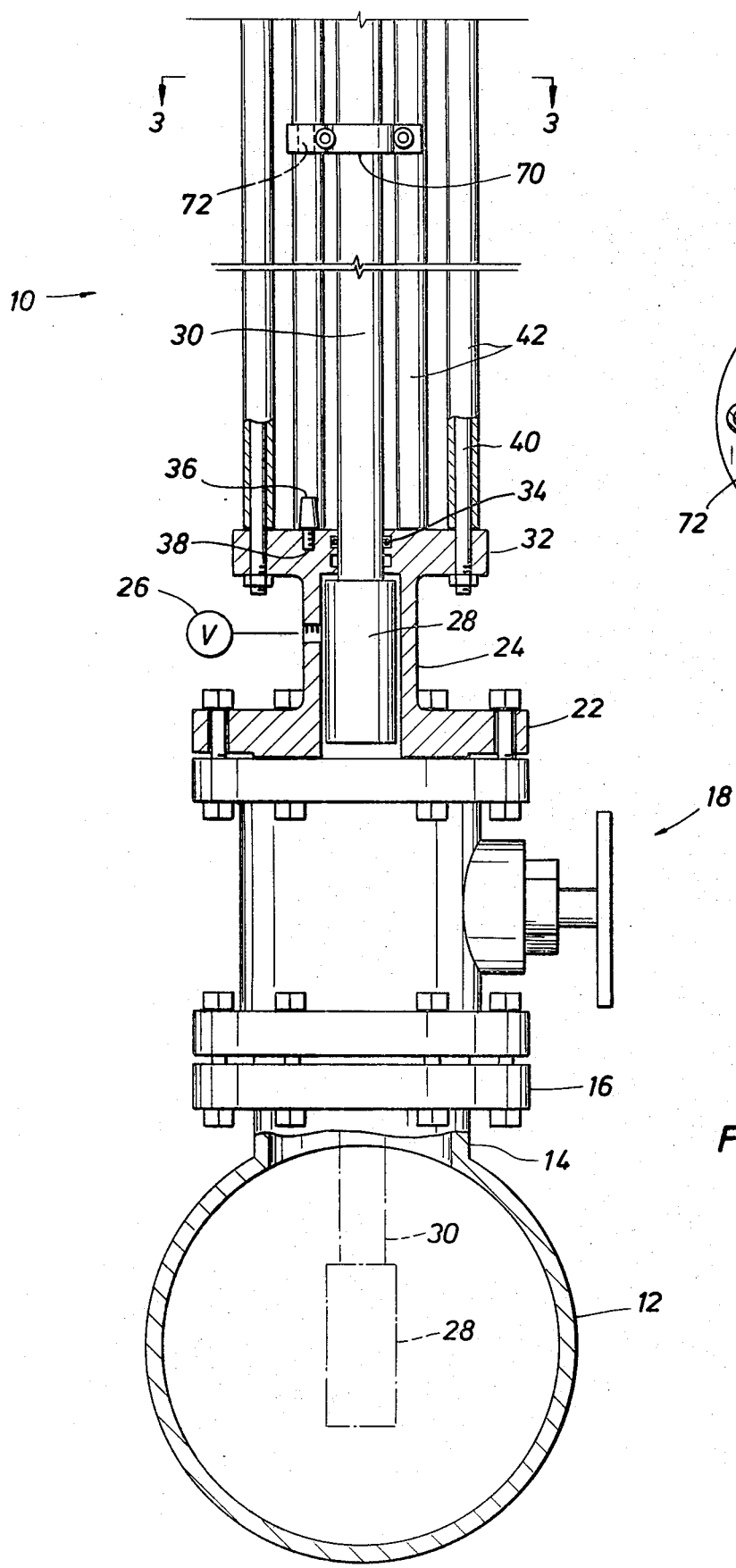
Figure 3:
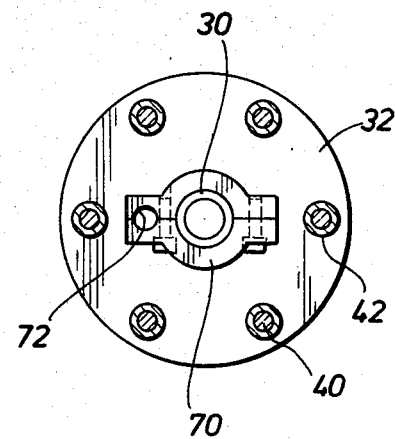
FIG. 3 is a sectional view along the line 3—3 of FIG. 1 showing details of construction of an alignment clamp attached to the probe body which assures alignment on insertion.

In the drawings, the numeral 10 identifies an insertion apparatus. It is adapted to be used with a pipeline 12. The pipeline 12 supports a tee 14 which terminates at a flange 16. The flange 16 supports a valve 18 which in turn can be opened or closed. The valve is incorporated to prevent leakage through the tee when the present invention is not installed. Moreover, the valve terminates at a flange plate 20. The flange plate 20 is a bottom or anchor flange adapted to be abutted against a flange 22. The flanges 20 and 22 are shown having approximately the same dimensions in FIG. 1. It will be appreciated that the modified and detachable flange construction which is disclosed in the previously issued patent of the same inventor may also be incorporated. In any case, the flange 22 serves as a connector flange. The flange is above an upstanding cylindrical body 24. The body 24 is axially hollow and is sealed on the interior. The interior is voided by means of a bleed valve 26. The valve 26 exhausts the chamber which is to the interior of the valve 18 and the connected apparatus.

The numeral 28 identifies the probe head. The term is applied to the apparatus which is axially positioned at the centerline of the pipe 12. The head 28 is shown symbolically. It may be round as, for instance, in the event it supports a turbine connected to a central shaft. Whatever the case, the probe head 28 typically is a shaped structure which is sized to be received within the housing 24. On retraction, the probe head 28 is sufficiently small to fit within the cavity provided for receiving the head as best illustrated in FIG. 1.

The probe head connects to the probe body 30. This term applies to the elongate cylindrical support rod. Rather than a solid rod, it is ideally constructed of a hollow tubular member. The interior is sized and shaped to receive an elongate circuit board to support the circuitry required for operation of the transducer. Accordingly, the probe head cooperates with signal conditioning apparatus received in the probe body 30.

The probe head inserts beneath the flange 32. In the upper or retracted position of FIG. 1, the probe head 28 is just below the flange 32. The flange supports suitable seals at 34. Moreover, the seals abut the probe body 30 and prevent leakage along the body. It will be recalled that pressure in the pipeline is elevated, perhaps to several hundred psi, and the area below the seals 34 is exposed to this pressure. Hence, the seals are incorporated to prevent leakage.

The flange plate supports an upstanding pin 36 which is anchored by a bolt 38. The bolt 38 aligns the pin 36 so that it in turn prevents rotation of the probe head 28 as will be described. Several holes are drilled in the flange plate 32 along a bolt circle. The holes receive several tie bolts 40. They are each enclosed in a tubing member 42. The tubing members 42 cooperate to provide both tension and compression in conjunction with the bolts 40. The flange plate 32 thus serves as a bottom plate for mounting the apparatus in an upstanding axially aligned position relative to the probe. To the end, the device includes several tie bolts, the typical quantity being between four and eight. Each bolt is enclosed in a tube. As shown in the drawings, the bolts pass through the bottom flange plate 32 and are threaded with suitable nuts. The bolts are in tension while the tubing members are in compression. They extend upwardly to join to a header plate 44. The header plate 44 matches the plate 32 and is spaced from it by the bolts and tubing. Accordingly, the header plate 44 is likewise drilled with matching holes on the common bolt circle and the bolts are shown extending through the header plate 44. The spaced flange plate 32 and the header plate 44 define an elongate cylindrical cavity. The probe body 30 telescopes into the cavity. It supports an enlargement at 46. The enlargement encloses angled fittings to direct a cable to the side to accommodate electrical connections. This is also shown in FIG. 2 of the drawings which is a sectional view through the apparatus.

The header plate 44 additionally receives and supports a power cylinder wall 48. The power cylinder wall 48 is received adjacent an upstanding or protruding cylindrical base machined on the header plate 44. It has an upstanding shoulder grooved to receive a seal. It stabs into the cylinder 48. This encloses a piston rod 50 extending downwardly from a piston 52. The piston rod 50 traverses the cylinder 48. The piston rod 50 passes through the header plate 44. Suitable bearings are included at 54 to align the piston rod. A seal is not required at this location. In other words, the chamber in the cylinder 48 below the piston 52 can leak to atmosphere.

The piston rod 50 transfers power from the piston 52. The piston itself is located below a top cylinder head 56. The head 56 clamps over the top end of the cylinder 48. It seals on the interior by means of a seal assembly 58. Suitable tie bolts 60 are threaded through the header plate 44 and the top cylinder head 56. Several are used, typically in the range of four to eight. They are tightened to place the bolts in tension and thereby compress the heads 44 and 56 on the cylinder wall 48.

The top chamber is defined above the piston 52. This chamber is adapted to receive fluid under pressure through a fitting 62. This connects with a fluid line 64 which extends to a valve 66. Preferably, hydraulic oil from a oil reservoir 68 is applied through the line 64 to pressurize the top chamber, and this is controlled by some inert gas applied under pressure from a source not shown. Through appropriate valving of the gas flow, the piston 52 is forced downwardly.

It is not necessary that the piston be double acting. A retraction force is inevitably created inasmuch as the probe head 28 is introduced into the pipeline 12 which is maintained at the elevated pressure. The elevated pressure in the pipeline forces the probe upwardly as shown in the drawings. Rather, oil under pressure is supplied to the piston 52 in the top chamber to force the rod down.

The probe head 28 is aligned in azimuth. The numeral 70 identifies a clamp which is fastened about the probe body 30. The clamp has a protuding arm which supports an opening at 72. The opening 72 is aligned with the post 36. As the piston 52 is forced downwardly, the probe body carries the clamp 70 in the proximity of the upstanding post 36 and the post 36 is forced into the opening 72. Some taper is provided in the post or in the drilled hole 72. Alignment is easily achieved. Moreover, the clamp 70 is secured in position by means of transverse set screws which lock the clamp at a specific location. The clamp should be adjusted in azimuth and elevation. The location of the clamp limits the downward travel of the apparatus. To this end, it accommodates variations in pipeline diameter which inevitably require a different measure of penetration.

The preferred embodiment of this apparatus is installed on a pipeline of some suitable size by mounting the apparatus adjacent to the valve 18 which terminates at the upwardly facing flange 20.

One the apparatus has been mounted above the valve 18, the flanges 20 and 22 are joined by customary techniques of bolting them together. They are bolted together with the probe head 28 in a raised position. Thereafter, the clamp 70 is adjusted in vertical location and azimuth to determine the angular position and length of stroke. The probe body 30 is connected through the protruding electrical cables in the customary fashion. The device is then prepared for use. Use involves the extension of the equipment by the application of hydraulic pressure through the lines 64 to the top side of the piston 52. The piston is forced downwardly, thereby extending the piston rod 50. The piston rod 50 is joined to the probe body 30 by means of a connective yoke. The piston rod 50 supports a transverse connective bar 74. The bar 74 is affixedly joined to the piston rod 50. The bar 74 extends laterally in two directions, and supports suitable tie bolts 76 and surrounding tubing members 78 which extend downwardly to a similar transverse bar 80. The bar 80 is formed of a pair of split bars shown better in FIG. 2 which are bolted together by set screws 82. This enables them to clamp around the cylindrical probe body 30.

As will be observed, the bar 80 functions as a connective yoke. It extends transversely of the probe body 30. The bar 80, once assembled, is joined to the similar bar 74 by the tie bolts and tubes. This couples the motion of the apparatus to the probe body 30.

The foregoing describes the preferred embodiment of this apparatus. It can be scaled from a small to large sizes depending on the stroke required. Moreover, it can be triggered into operation as required. It is particularly able to extend the probe head into the pipeline on command, and of course, enables its retraction. Extension requires the application of positive hydraulic pressure while retraction simply requires the reduction of that hydraulic pressure. It will be recognized that there is an expulsive force acting on the probe head which forces the probe from the pipeline under pressure drive. Moreover, this force is able to clear the pipeline of the sensor or transducer apparatus on command.

While the foregoing is directed to the preferred embodiment of the present invention, other and further embodiments of the invention may be devised without departing from the basic concept thereof, and the scope thereof is determined by the claims which follow.

I claim:

1. An apparatus for mounting an elongate sensor means for insertion into and removal from a pipeline against the pressure acting in the pipeline which apparatus is adapted to connect to the pipeline at a tee on the pipeline and which comprises:
   (a) an elongate cylinder having a lower end and adapted to be positioned approximately perpendicular to the axis of a pipeline;
   (b) a piston slidably positioned in said cylinder;
   (c) means for mounting said cylinder aligned with and above said tee in the pipeline;
   (d) a piston rod connected to said piston and extending from said cylinder toward the tee for reciprocation by said piston;
   (e) elongate connector means having an exposed portion and also joining said piston rod to said sensor means and aligned therewith at one end thereof which end is inserted into and removed from the pipeline by operation of said piston moving in said cylinder said connector means being adapted to facilitate installation and operation of said sensor means;
   (f) a flanged plate joinable to the tee and including seal means adjacent an opening therein, said seal means an opening defining a passage enabling said sensor means to be inserted through the tee and into the pipeline wherein a portion of said sensor means extends from the opening for cooperation with said connector means; and
   (g) an open frame member connected between the lower end of said elongate cylinder and said flanged plate, said open frame member aligning said connector means for exposed insertion movement thereof toward said flanged plate.

2. The apparatus of claim 1 including a cylinder head at the top end of said cylinder which, in conjunction with a separate and parallel head plate, defines ends for said cylinder to divide said cylinder into a top chamber above said piston so that said piston is forced by pressure in said top chamber to extend said piston rod.

3. The apparatus of claim 2 including means for aligning said sensor means at a selected aximuthal orientation to prevent rotation of said sensor means after insertion wherein said alignment means includes a fixed protruding member and a means secured to said sensor means which member and means are brought together in coating fashion to limit rotation of said sensor means on insertion of said sensor means by axial movement of said piston and piston rod.

4. The apparatus of claim 1 including means for aligning said sensor means at a selected azimuthal orientation to prevent rotation of said sensor means after insertion wherein said alignment means includes a fixed protruding member and a means secured to said sensor means which member and means are brought together in coacting fashion to limit rotation of said sensor means on insertion of said sensor means by axial movement of said piston and piston rod.

5. The apparatus of claim 1 further including an axially hollow body affixed to said flanged plate terminating in a pair of spaced flanges, the lower flange conforming to the tee for connection to the tee and the upper flange defining an exposed opening with said seal means therein.

6. The apparatus of claim 5 wherein said axially hollow body includes a bleed valve connected to drain the interior thereof, and said body supports said flanges parallel and spaced about said seal means, and said opening is one end of an axial passage between both of said flanges.

7. The apparatus of claim 3 further including an axially hollow body affixed to said flanged plate terminating in a pair of spaced flanges, the lower flange conforming to the tee for connection to the tee and the upper flange defining an exposed opening with said seal means therein.

8. The apparatus of claim 1 wherein
   (a) said open frame member comprises a set of parallel bolts and cooperative sleeve means defining an open frame of rigid construction; and
   (b) said elongate connector means terminates at an upper end having an exposed location for reciprocation exposed through said open frame member to enable electric conductors to be connected to said upper end wherein the cables extend through said open frame member during sensor means insertion and removal.

9. The apparatus of claim 8 further wherein:
   (a) said fixed protruding member comprises a tapered upstanding post;
   (b) said secured means comprises a member having a hole fitting around said post; and
   (c) said member is attached to said connector means for movement with said sensor means toward said post.

* * * * *